(12) United States Patent
Goerg et al.

(10) Patent No.: US 7,764,771 B2
(45) Date of Patent: Jul. 27, 2010

(54) METHOD OF RECORDING INVENTION DISCLOSURES

(75) Inventors: Charles H. Goerg, Alpharetta, GA (US);
James Morgenstern, Neenah, WI (US);
Jennifer Marvin, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1443 days.

(21) Appl. No.: 10/746,122

(22) Filed: Dec. 24, 2003

(65) Prior Publication Data
US 2005/0147214 A1 Jul. 7, 2005

(51) Int. Cl.
*H04M 11/06* (2006.01)

(52) U.S. Cl. .............. 379/88.14; 369/25.01; 600/300; 704/235; 704/270; 704/275; 705/1.1; 715/201; 715/210; 715/234

(58) Field of Classification Search ............. 379/75, 379/88.14, 88.04; 704/235, 270, 275; 715/530, 715/201, 210, 234; 369/25.01; 600/300; 705/1.1
See application file for complete search history.

(56) References Cited

U.S. PATENT DOCUMENTS

| | | | | |
|---|---|---|---|---|
| 5,146,439 A | * | 9/1992 | Jachmann et al. | 369/25.01 |
| 5,148,366 A | * | 9/1992 | Buchanan et al. | 715/234 |
| 5,267,155 A | * | 11/1993 | Buchanan et al. | 715/210 |
| 5,519,808 A | * | 5/1996 | Benton et al. | 704/270 |
| 5,608,786 A | | 3/1997 | Gordon | |
| 5,689,550 A | | 11/1997 | Garson et al. | |
| 5,712,903 A | | 1/1998 | Bartholomew et al. | |
| 5,742,905 A | | 4/1998 | Pepe et al. | |
| 5,772,585 A | * | 6/1998 | Lavin et al. | 600/300 |
| 5,802,466 A | | 9/1998 | Gallant et al. | |
| 5,822,405 A | | 10/1998 | Astarabadi | |
| 5,825,854 A | | 10/1998 | Larson et al. | |
| 5,960,447 A | * | 9/1999 | Holt et al. | 715/201 |
| 5,987,100 A | | 11/1999 | Fortman et al. | |
| 5,995,936 A | * | 11/1999 | Brais et al. | 704/275 |
| 6,023,700 A | | 2/2000 | Owens et al. | |
| 6,058,164 A | | 5/2000 | Ibuka et al. | |
| 6,061,718 A | | 5/2000 | Nelson | |
| 6,064,723 A | | 5/2000 | Cohn et al. | |
| 6,072,862 A | | 6/2000 | Srinivasan et al. | |
| 6,075,844 A | | 6/2000 | Goldberg et al. | |
| 6,085,231 A | | 7/2000 | Agraharam et al. | |
| 6,122,614 A | * | 9/2000 | Kahn et al. | 704/235 |

(Continued)

OTHER PUBLICATIONS

Stephen G. Kunin, Legal Framework for the Use of the Electronic Filing System, May 21, 2002.*

*Primary Examiner*—Gerald Gauthier
(74) *Attorney, Agent, or Firm*—Armstrong Teasdale, LLP

(57) ABSTRACT

The method of the present invention allows inventors to orally document innovative concepts. The method reduces the need to have inventors write out details of an invention in an invention disclosure form. The method also assists inventors in quickly and conveniently recording ideas and preparing invention disclosure forms based on the ideas. In some example forms, inventors are able to pick up a telephone and connect to a network. Once connected to the network an inventor can dictate the concepts of the idea over the network. The dictation is converted into text, such as by a voice analysis program, and then inserted into an invention disclosure form which is dated and archived.

23 Claims, 4 Drawing Sheets

U.S. PATENT DOCUMENTS

| | | |
|---|---|---|
| 6,161,082 A | 12/2000 | Goldberg |
| 6,173,259 B1 | 1/2001 | Bijl et al. |
| 6,219,638 B1 | 4/2001 | Padmanabhan et al. |
| 6,259,657 B1 * | 7/2001 | Swinney ............ 704/270 |
| 6,282,154 B1 * | 8/2001 | Webb ............ 704/275 |
| 6,366,882 B1 | 4/2002 | Bijl et al. |
| 6,654,448 B1 | 11/2003 | Agraharam et al. |
| 6,834,264 B2 * | 12/2004 | Lucas et al. ............ 704/235 |
| 7,246,060 B2 * | 7/2007 | Geidl et al. ............ 704/235 |
| 7,444,285 B2 * | 10/2008 | Forbes ............ 704/235 |
| 7,590,534 B2 * | 9/2009 | Vatland ............ 704/235 |
| 2004/0168129 A1 * | 8/2004 | Roebuck ............ 715/530 |

* cited by examiner

METHOD OF RECORDING INVENTION DISCLOSURES

BACKGROUND

One of the reasons that companies hire employees, such as scientists and engineers, is to develop new ideas (i.e., innovate). Innovation may be done to improve existing products, methods or processes, or to develop new products, methods or processes. Companies often convert the ideas that are conceived and documented by employees into intellectual property (e.g., patents) to protect the innovations.

Most companies have processes in place to obtain intellectual property for the innovations that are made by employees. When an employee comes up with an innovation, the employee usually documents the idea in an invention disclosure form that is reviewed by others in the company. A typical invention disclosure form includes questions that illicit responses from the employee/inventor relating to the idea and it's application.

One drawback with invention disclosure forms is that employees often fail to fill them out. When an employee fails to document and submit an idea on an invention disclosure form, a company often times never gets the opportunity to convert the idea into valuable intellectual property.

Employees often fail to document their ideas on invention disclosure forms because filling out such forms can be an intimidating and time-consuming process for individuals. Filling out an invention disclosure form can be especially intimidating to individuals that are unfamiliar with such forms or lack the capacity to adequately write down their ideas.

In addition, an individual may conceive of an idea when the individual is away from a laboratory notebook or computer that could be used to document the idea. There are times when individuals are unable to document their ideas and the ideas are irreparably lost (i.e., forgotten).

SUMMARY OF THE INVENTION

The method of the present invention overcomes such drawbacks by allowing inventors to orally document innovative concepts. The method reduces the need to have inventors immediately write out details of an idea in an invention disclosure form. The method also assists inventors in quickly and conveniently recording ideas and preparing invention disclosure forms based on the ideas.

In some example forms of the method, inventors are able to pick up a telephone and connect to a network by dialing a number. Once connected to the network, an inventor can dictate the concepts of the idea over the network. The dictation is converted into text, such as by a voice analysis program, and then inserted into an invention disclosure form which is dated and archived.

In some forms, the present invention relates to a method of filling out an invention disclosure form. The method includes receiving dictation from an inventor over a network; converting the dictation to text; and placing the text within the invention disclosure form.

In another form, the method includes receiving dictation from a plurality of inventors over a network; converting the dictation to text, the text identifying each inventor's contribution to the dictation; and placing the text within the invention disclosure form.

In still another form, the method includes receiving a request from an inventor to connect to a network; supplying oral queries to the inventor over the network; receiving dictation from the inventor over the network in response to the oral queries; converting the dictation to text; and placing the text within the invention disclosure form.

In yet another form, the method includes receiving dictation from an inventor over a network; receiving oral requests from the inventor for files over the network; converting the dictation to text; retrieving the files over the network; placing the text within the invention disclosure form; and attaching the files to the invention disclosure form.

In some forms, the present invention relates to a method of documenting an invention. The method includes receiving dictation from an inventor over a network; converting the dictation to text; and transmitting the text to an intended recipient.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the invention.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. Like parts depicted in the drawings are referred to by the same reference numerals.

DETAILED DESCRIPTION

In the following detailed description, reference is made to the accompanying drawings, which show specific embodiments in which the invention may be practiced. These embodiments are described in sufficient detail to enable those skilled in the art to practice the invention. It is to be understood that other embodiments may be utilized and structural changes made, such that the following detailed description is not to be taken in a limiting sense.

Figure 1:
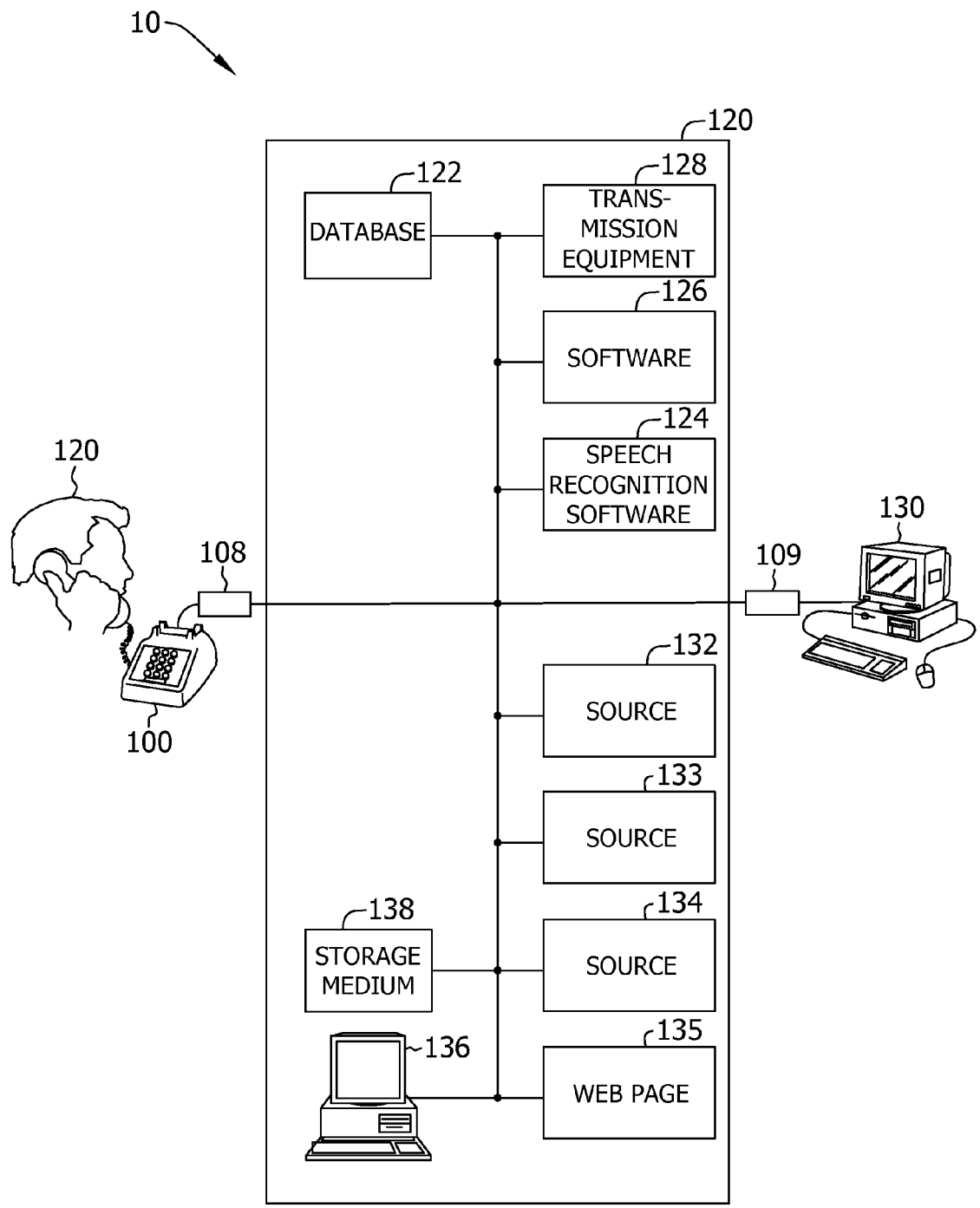
FIG. 1 is a block diagram illustrating a sample system that may be used to perform some example methods of the present invention.

FIG. 1 illustrates a block diagram of an example network-based system 10 that may be used to perform some methods of the present invention. The system 10 includes a network 120 that receives dictation from an inventor 20 through one or more devices (e.g, telephone 100) that are connected to the network 120 through a carrier switch 108. The network 120 converts the dictation from the inventor 20 into text using known speech recognition software 124, which is stored on the network 120. The network 120 may transmit the text to a recipient's receiving apparatus 130 that is connected to the network 120 through a carrier switch 109. It should be noted that network 120 may be any type of network-based system, including an integrated services provider network or a telephone network that provides interconnection between the inventor's telephone 100 and the recipient's receiving apparatus 130.

The speech recognition software 124 may be capable of converting the dictation into a variety of different types of text that can be inserted into a document, such as an invention disclosure form. In addition, the speech recognition software 124 may be capable of translating the dictation from one language to another. In some example systems, the network 120 may further include software 126 that is capable of sending the text as part of an electronic mail (e-mail) message, or as a document that may be faxed to one or more recipients. The network 120 may also contain a variety of transmission equipment 128 that is adapted to transmit the text to the recipient's receiving apparatus 130.

The recipient's receiving apparatus 130 may be a variety of different types of equipment (e.g., a personal computer or a facsimile machine). The apparatus 130 and the transmission equipment 128 on the network 120 need to be compatible so that the apparatus 130 is able to receive the particular type of information that is transmitted by the network 120.

In some forms, the inventor 20 may be able to identify the individuals that are to receive the document (e.g., a filled out invention disclosure form) which is created from the dictation. As an example, if the document is to be e-mailed to multiple recipients, the software 126 on the network 120 may be able to determine each intended recipient's e-mail address. In some forms, the inventor 20 may orally input the e-mail address for each recipient as part of the dictation. The software 126 on the network 120 may even prompt the inventor to orally indicate each intended recipient's e-mail address. The software 126 may also identify a recipient's e-mail address when the inventor orally inputs the recipient's name. This type of information may be obtained by the network 120 from a database 122 that contains (among other information) identification information for potential recipients.

It should be noted that the speech recognition software 124 may contain specialized databases that improve the efficiency and accuracy of transcribing dictation to text. The specialized databases may be necessary because some technical areas include language that would not normally be recognized by most voice recognition software programs.

The system 10 may query the inventor 20 as to the type of technology involved with the idea. When the inventor 20 dictates a response that identifies the technology, the system 10 can select one or more specialized databases that are used by the voice recognition software 124.

In some forms, the network 120 may be capable of attaching files to the invention disclosure form that is created from the dictation. The files may be selected from any number of sources 132, 133, 134 on the network 120. The files may be text files, audio/video files, or any combination thereof. As an example, the network 120 may have access to other electronic files that are in the possession of the inventor 20 (e.g., those saved on the inventor's web page 135 or computer 136) such that the inventor 20 could attach these files to the invention disclosure form.

The software 126 may also permit the inventor 20 to request a search of one, some, or all of the sources (e.g., internal and external databases) on the network 120 for one or more files on the network 120. As an example, the inventor 20 may request a search of all U.S. patents that include a particular patent number, a certain inventor, a certain phrase, or are owned by a particular company. Any files that are discovered during the search may be attached to the invention disclosure form that is created from the dictation. It should be noted that the scope of the search will only be limited by the sources that can be accessed from the network 120.

After converting the dictation to text, the system 10 may audibly provide the inventor with one or more of the recipient's name, e-mail address (or fax number), identification of any attached documents and text content (among other pieces of information). Reviewing some, or all, of this information allows the inventor 20 to verify that the speech recognition software 124 has accurately converted one or more portions of the dictation.

In some forms, inventors may receive real-time transmission of the text at their own computer system 136. In some forms, the text may already be inserted into an appropriate place in the invention disclosure. Providing text to the inventors in real-time allows the inventors to confirm dictation accuracy. This may be especially important when the inventors speak different languages.

The inventor 20 may modify any incorrect information before disconnecting from the network 120. The system 10 may also be able to notify the inventor 20 that the invention disclosure has been sent to the recipient(s) if the inventor 20 is still connected to the network 120.

The system 10 may also include a storage medium 138 that stores information related to submitting the dictation over the network 120. As examples, the information may be in the form of data that indicates the time of the transmission, the inventor(s), the recipient(s), the documents attached, and the method of transmission (e.g., e-mail message or fax document). Additional information may also be stored onto the storage medium 138 depending upon the requirements of the inventor, the recipient, and the network service provider.

It should be noted that even though the network 120 is described as transmitting the text to a single recipient, the network 120 may be capable of transmitting the text to multiple recipients. In some forms, the inventor 20 may orally indicate a group-identifier that is recognized by the software 126 as designating a particular plurality of individuals as recipients.

Figure 2:
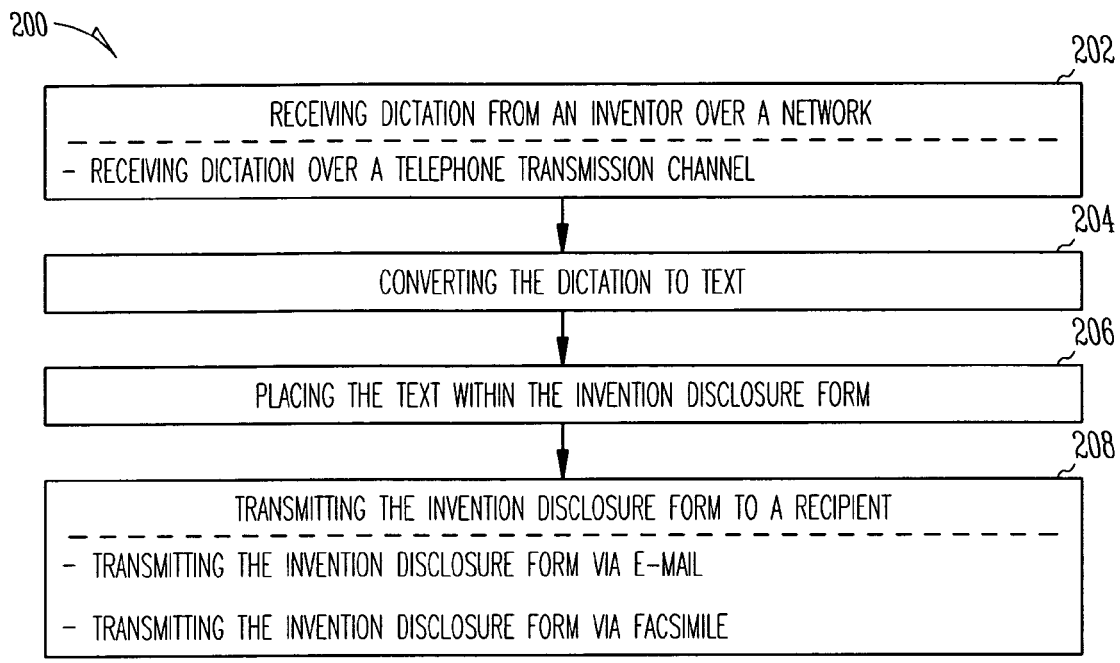
FIG. 2 illustrates a method of filling out an invention disclosure form.

FIG. 2 illustrates an example method 200 method of filling out an invention disclosure form. The method 200 includes 202 receiving dictation from an inventor over a network and 204 converting the dictation to text. The method further includes 206 placing the text within the invention disclosure form. It should be noted that 202 receiving dictation from an inventor over a network may include receiving dictation over a telephone transmission channel (among other types of networks).

The method 200 may further include 208 transmitting the invention disclosure form to a recipient (e.g., via e-mail or facsimile). In some forms, the invention disclosure form may be e-mailed to each inventor, one or more supervisors, a patent attorney or any other individual that might be interested in the concept described in the invention disclosure form.

Figure 3:
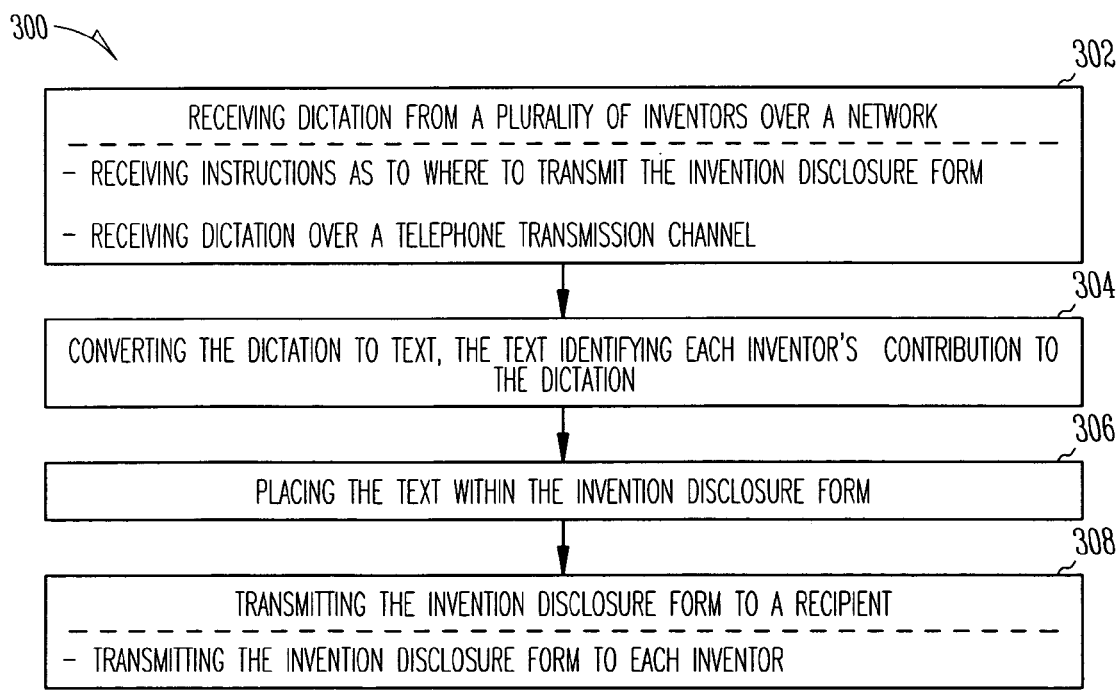
FIG. 3 illustrates another method of filling out an invention disclosure form.

FIG. 3 illustrates another example method 300 of filling out an invention disclosure form. The method 300 includes 302 receiving dictation from a plurality of inventors over a network and 304 converting the dictation to text. The text identifies each inventor's contribution to the dictation. In addition, each of the inventors may be speaking different languages such that some of the dictation may be translated as it is converted to text. It should be noted that the inventors may be at one or more locations when they are connected to the network.

The method further includes 306 placing the text within the invention disclosure form.

In some forms of the method 300, 302 receiving dictation from a plurality of inventors over a network may include (i) receiving instructions as to where to transmit the invention disclosure form; and/or (ii) receiving dictation over a telephone transmission channel.

The method 300 may further include 308 transmitting the invention disclosure form to one or more recipients. As examples, the recipients may include each inventor, one or more supervisors, a patent attorney or any other individual that might be interested in the concept described in the invention disclosure form.

Figure 4:
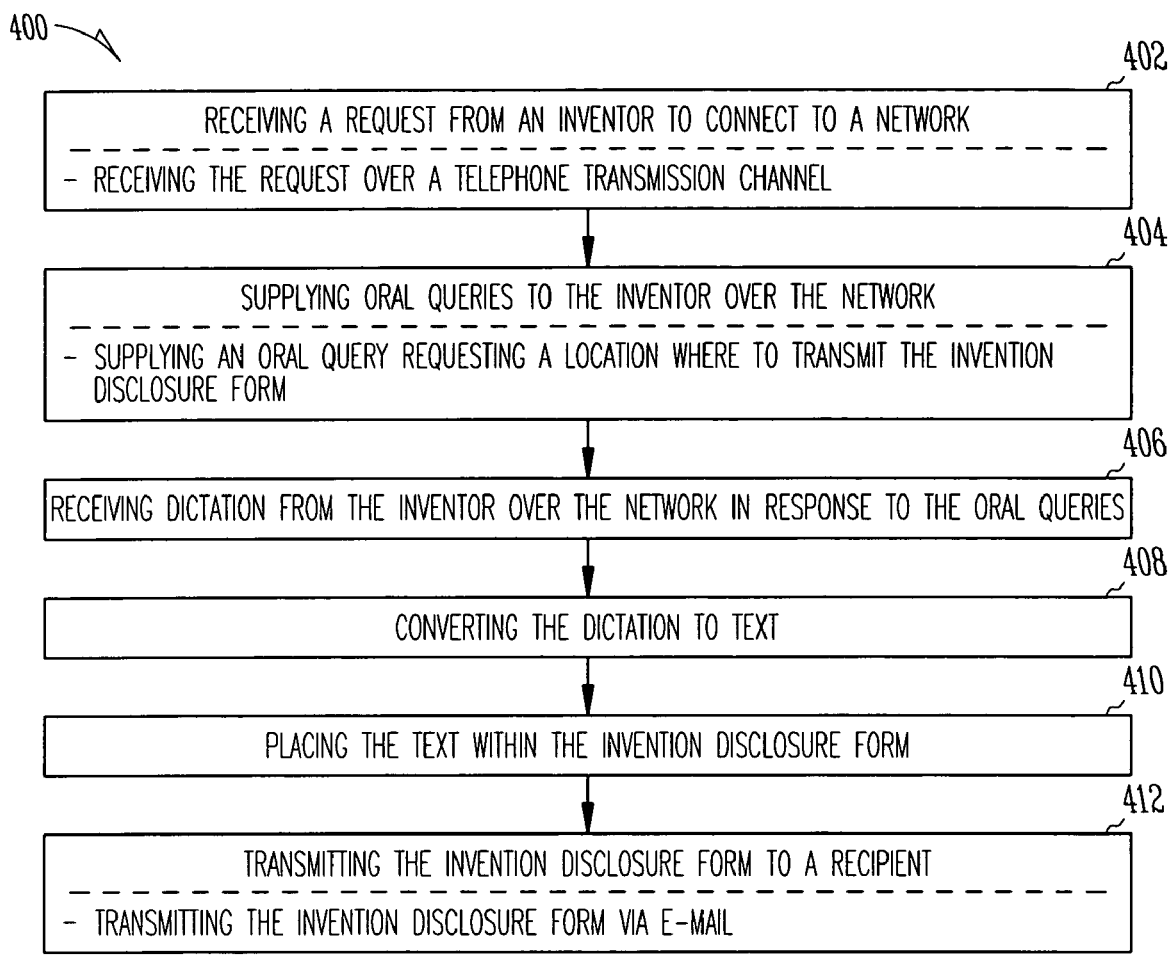
FIG. 4 illustrates still another method of filling out an invention disclosure form.

FIG. 4 illustrates another example method 400 of filling out an invention disclosure form. The method 400 includes 402 receiving a request from an inventor to connect to a network and 404 supplying oral queries to the inventor over the network. The method further includes 406 receiving dictation from the inventor over the network in response to the oral queries and 408 converting the dictation to text. The method also includes 410 placing the text within the invention disclosure form.

It should be noted that 404 supplying oral queries to the inventor over the network may include supplying an oral query requesting a location as to where to transmit the invention disclosure form. In some forms, the queries may include a brief training period in which the inventor is asked to repeat several words or phrases to train the voice analysis software so that the software is able to properly interpret the speech of one or more inventors and indicates within the text how each inventor contributed to the dictation.

In addition, the queries may include a series of questions that are designed to draw out elements of the invention and provide information needed to fill out an invention disclosure form. As an example, the queries may ask the inventor to state (i) what problem is being solved by the invention; (ii) what elements, steps, or tools are used to solve the problem; (iii) how these elements, steps, or tools are used or combined to solve the problem; (iv) how the invention is different than the prior art; (v) the identity of any other inventors; and/or (vi) where any samples that embody the concepts are located.

The method 400 may further include 412 transmitting the invention disclosure form to one or more recipients. In addition, 402 receiving a request from an inventor to connect to a network may include receiving the request over a telephone transmission channel (among other types of networks).

Figure 5:
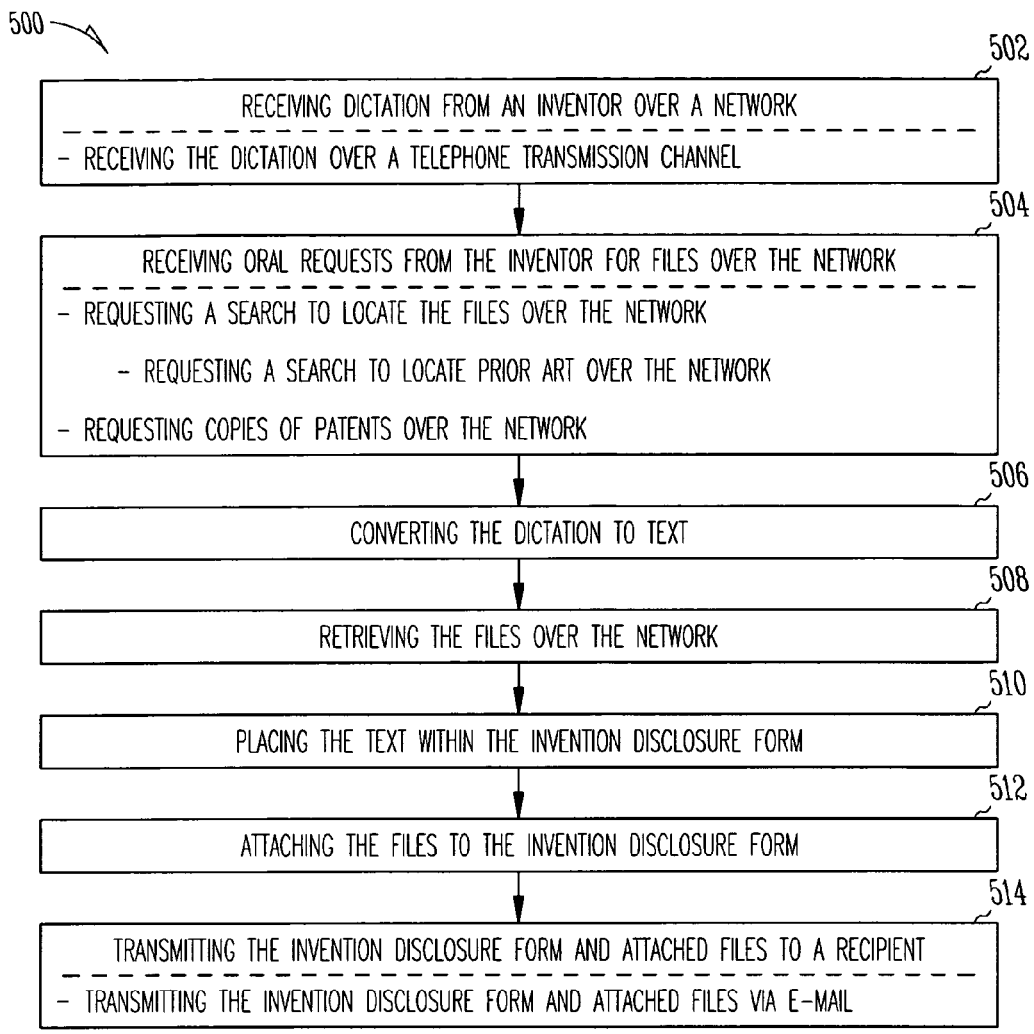
FIG. 5 illustrates yet another method of filling out an invention disclosure form.

FIG. 5 illustrates another example method 500 of filling out an invention disclosure form. The method 500 includes 502 receiving dictation from an inventor over a network and 504 receiving oral requests from the inventor for files over the network. The method further includes 506 converting the dictation to text and 508 retrieving the files over the network. The method also includes 510 placing the text within the invention disclosure form and 512 attaching the files to the invention disclosure form.

504 Receiving oral requests from the inventor for files over the network may include requesting a search to locate the files over the network. As an example, requesting a search to locate the files over the network may include locating prior art. In addition, 504 receiving oral requests from the inventor for files over the network may include requesting copies of patents (or other documents) over the network. It should be noted that any type of file may be requested, searched for, or attached, as long as the network is capable of finding, retrieving and transmitting the file.

The method 500 may further include 514 transmitting the invention disclosure form and attached files to one or more recipients (e.g., via e-mail or facsimile). In addition, 502 receiving dictation from an inventor over a network may include receiving dictation over a telephone transmission channel (among other types of networks).

Figure 6:
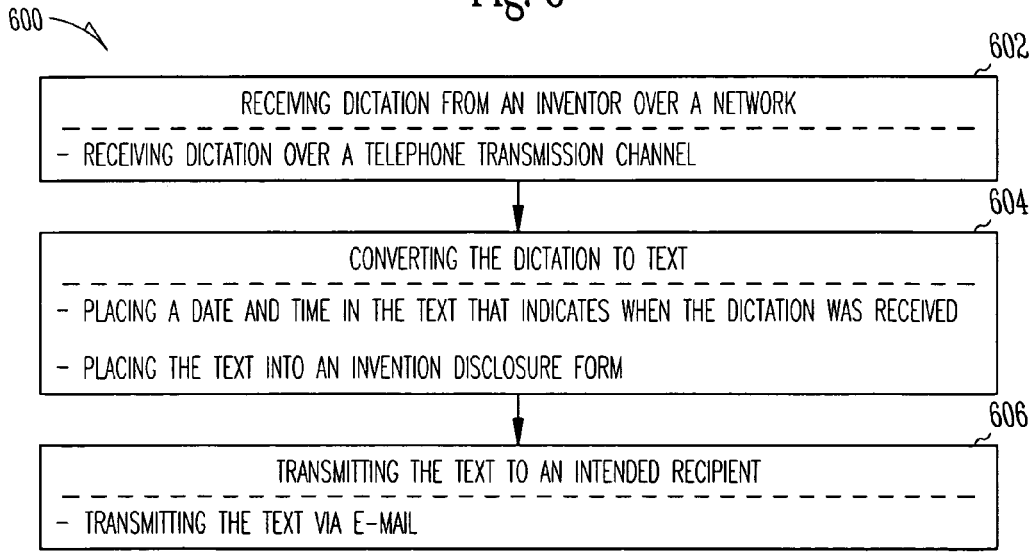
FIG. 6 illustrates a method of documenting an invention.

FIG. 6 illustrates an example method 600 of method of documenting an invention. The method 600 includes 602 receiving dictation from an inventor over a network and 604 converting the dictation to text. The method further includes 606 transmitting the text to an intended recipient.

The method 600 may further include 606 transmitting the invention disclosure form to one or more recipients (e.g., via e-mail or facsimile). In addition, 602 receiving dictation from an inventor over a network may include receiving dictation over a telephone transmission channel (among other types of networks).

In some forms, 604 converting the dictation to text may include (i) placing a date and time in the text that indicates when the dictation was received; and/or (ii) placing the text into an invention disclosure form. It should be noted that the dictation from the inventor(s) may be converted into text and automatically placed in the appropriate fields of the invention disclosure form. In addition, a recording of the dictation may be time-stamped, and/or a corresponding document (e.g., an invention disclosure form) that is generated based on the dictation may also be archived and time-stamped.

The document may also be identified with an indicator (e.g., a serial number) such that one or more inventors can access the document in order supplement or amend the information contained in the document. The modified document may then again be archived and time-stamped.

The operations discussed above with respect to the described methods may be performed in a different order from those described herein. While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

We claim:

1. A method of filling out an invention disclosure form, the method comprising:

receiving dictation from an inventor over a network, the dictation being related to a concept at least in part attributable to the inventor;

converting the dictation to text with a computer having processor;

using the computer to place the text into the invention disclosure form;

searching for prior art relating to the concept;

attaching any prior art located during the search to the invention disclosure form; and transmitting the invention disclosure form with the located prior art to a recipient.

2. The method of claim 1 wherein transmitting the invention disclosure form to a recipient includes transmitting the invention disclosure form via e-mail.

3. The method of claim 1 wherein transmitting the invention disclosure form to a recipient includes transmitting the invention disclosure form via facsimile.

4. The method of claim 1 wherein receiving dictation from an inventor over a network includes receiving dictation over a telephone transmission channel.

5. A method of filling out an invention disclosure form, the method comprising:

receiving dictation from a plurality of inventors over a network, the dictation being related to a concept attributable to the inventors;

converting the dictation to text with a computer having a processor; and using the computer to place the text into the invention disclosure form, the computer identifying each of the inventor's contributions to the concept in the invention disclosure form.

6. The method of claim 5 further comprising:

transmitting, with the computer, the invention disclosure form to a recipient.

7. The method of claim 6 wherein transmitting the invention disclosure form to a recipient includes transmitting the invention disclosure form to each inventor.

8. The method of claim 6 wherein receiving dictation from a plurality of inventors includes receiving instructions as to where to transmit the invention disclosure form.

9. The method of claim 5 wherein receiving dictation from a plurality of inventors over a network includes receiving dictation over a telephone transmission channel.

10. A method of filling out an invention disclosure form, the method comprising:

receiving a request from an inventor to connect to a network;

supplying oral queries to the inventor over the network;

receiving dictation from the inventor over the network in response to the oral queries, the dictation being related to a concept at least in part attributable to the inventor;

converting the dictation to text with a computer having a processor;

using the computer to place the text into the invention disclosure form;

searching for prior art relating to the concept;

attaching any prior art located during the search to the invention disclosure form; and transmitting the invention disclosure form with the located prior art to a recipient.

11. The method of claim 10 wherein transmitting the invention disclosure form to a recipient includes transmitting the invention disclosure form via e-mail.

12. The method of claim 10 wherein supplying oral queries to the inventor over the network includes supplying an oral query requesting a location where to transmit the invention disclosure form.

13. The method of claim 10 wherein receiving the request from the inventor to connect to the network includes receiving the request over a telephone transmission channel.

14. A method of filling out an invention disclosure form, the method comprising:

receiving dictation from an inventor over a network, the dictation being related to a concept at least in part attributable to the inventor;

receiving oral requests from the inventor for a search to locate files over the network related to the concept;

converting the dictation to text with a computer having a processor;

retrieving, with the computer, the files over the network;

using the computer to place the text into an invention disclosure form;

attaching the files to the invention disclosure form; and transmitting, with the computer, the invention disclosure form and attached files to a recipient.

15. The method of claim 14 wherein transmitting the invention disclosure form and attached files to an intended recipient includes transmitting the invention disclosure form and attached files via e-mail.

16. The method of claim 14 wherein requesting a search to locate the files over the network includes requesting a search to locate prior art over the network.

17. The method of claim 14 wherein receiving oral requests from the inventor for files over the network includes requesting copies of patents over the network.

18. The method of claim 14 wherein receiving dictation from the inventor over the network includes receiving the dictation over a telephone transmission channel.

19. A method of documenting an invention, the method comprising:

receiving dictation from a plurality of inventors over a network, the dictation being related to a concept attributable to the inventors;

converting the dictation to text with a computer having a processor;

using the computer to place the text into an invention disclosure form, the computer identifying each of the inventor's contributions to the concept in the invention disclosure form; and transmitting, with the computer, the text to an intended recipient.

20. The method of claim 19 wherein transmitting the text to an intended recipient includes transmitting the text via e-mail.

21. The method of claim 19 wherein receiving the dictation from the inventor over the network includes receiving dictation over a telephone transmission channel.

22. The method of claim 19 wherein converting the dictation to text includes placing a date and time in the text that indicates when the dictation was received.

23. The method of claim 19 wherein converting the dictation to text includes using the computer to translate the dictation which is in one language into text of a different desired language.

* * * * *